Dec. 8, 1959 R. W. KETCHLEDGE 2,916,660

ELECTRON BEAM POSITIONING SYSTEM

Filed Aug. 5, 1957 2 Sheets-Sheet 1

INVENTOR
R. W. KETCHLEDGE
BY
[signature]
ATTORNEY

ELECTRON BEAM POSITIONING SYSTEM

INVENTOR
R. W. KETCHLEDGE
BY
ATTORNEY

United States Patent Office 2,916,660

Patented Dec. 8, 1959

2,916,660

ELECTRON BEAM POSITIONING SYSTEM

Raymond W. Ketchledge, Whippany, N.J., assignor to Bell Telephone Laboratories, Incorporated, New York, N.Y., a corporation of New York Application August 5, 1957, Serial No. 676,171

11 Claims. (Cl. 315—8.5)

This invention relates to beam positioning apparatus and more particularly to cathode ray positioning devices comprising a plurality of target elements.

For various beam positioning applications, notably in information storage systems, a factor vital to satisfactory operation is rapid and accurate positioning of the cathode ray tube beam on the precise area of the storage surface from which information is to be derived or at which information is to be stored.

The positioning system which will satisfy these exacting requirements and maintain a high performance standard over long periods of time must necessarily comprise a minimum of active elements subject to wear and consequent variation. Such a system may comprise a coded plate and a cathode ray tube with servo beam positioning in accordance with output signals derived from portions of the electron beam passing through the coded plate. An example of a system incorporating this technique is the system described in C. W. Hoover, Jr., and R. W. Ketchledge, Patent 2,855,540, issued October 7, 1958.

The coded plate for such a system may be considered as comprising a medial information portion divided into rows and columns of apertures, the number and position of apertures in each row defining binary code designations equivalent to the binary code beam address information. The size of the medial portion is determined by the number of binary address digits required to deflect the beam to a given number of positions on the surface of the coded plate.

Extreme beam deflections are not utilized for information readout due to the loss of resolution and related difficulties encountered at such deflection positions. The information bearing section of the coded plate is confined to a medial portion so as to receive the beam only in the usable deflection range, thus obviating the need for extreme deflections to reach any information bearing row of the coded plate. The usable beam deflection range may be defined, therefore, as that range of beam deflections which will allow impingement of the beam on any selected row in the medial or information portion of the coded plate.

The system disclosed in Patent 2,855,540, cited hereinbefore, provides rapid and accurate deflection error correction when such deflection errors occur within the medial portion of the coded plate, since output information from each row within the medial portion provides a distinct position indication. Output signals derived from erroneous beam deflections to any position beyond the edges of the medial portion, however, are not indicative of the position and thus do not provide intelligible information for comparison with the binary code address information for beam repositioning. This is known as the "edge effect."

Efforts to overcome the edge effect noted in the prior art comprise extending the extreme coded rows in the information portion of the coded plate to the extremes of beam deflection. In this fashion erroneous beam deflection beyond the usable deflection range provides output signals equivalent to those derived from the beam impinging an extreme row of the medial information portion. However, for a servo system, required to reposition the beam rapidly and accurately, this modification is of negligible assistance.

It is an object of this invention to provide an improved beam positioning system and more specifically a beam positioning system which will correct any erroneous beam deflection.

Another object of this invention is to overcome the edge effect in beam positioning systems; i.e., to facilitate erroneous beam position correction with equal dispatch within the usable deflection range or beyond the edges of the medial information area of the coded plate.

Another object of this invention is to improve the speed and accuracy of correction of such erroneous beam deflections.

In one illustrative embodiment of this invention, a beam positioning system comprises a cathode ray tube having means for focusing an electron beam in a narrow line upon a coded plate, a plurality of targets positioned to receive portions of the beam passing through the coded plate, a deflection system to deflect the beam over the coded plate, means for applying analog representations of binary code address signals to the deflection system, and means for comparing a converted form of the binary code address signals with output signals from the targets and applying the resultant to the deflection system.

The application of each binary code address to the tube should result in deflection of the beam within the usable deflection range to a distinct corresponding row of apertures in the medial information portion of the coded plate in order to produce a binary code output equivalent to the binary code address. The accuracy of beam deflection then is verified by comparison of the address and output signals. The comparison means detects the magnitude and direction of deflection errors by determining the magnitude and sign of the difference between the address and output binary code signals it receives. Error signals of corresponding magnitude and sign are delivered to the deflection system to reposition the beam.

In prior art systems erroneous beam deflection in one coordinate outside the usable deflection range caused the beam to overshoot the medial information area of the coded plate and produce the same output signal for every beam position outside the usable range. For optimum servo speed, an overshoot of the usable deflection area should produce as large an error signal as a similar overshoot within the usable deflection area. With identical output signals for any beam position beyond the edges of the usable area, as shown in the prior art, this condition cannot maintain.

In accordance with this invention, rows of apertures forming distinct binary code numbers are added to the coded plate extending it to the beam deflection limits. This is accomplished by adding an additional column of apertures to the coded plate. Also the number of digit positions in the binary code address is modified to correspond to the modified number of columns in the coded plate by moving the most significant digit of the binary code address one position in the more significant direction and inserting its complement in the vacated position.

The binary code address information will deflect the beam within the usable deflection area so as to impinge the central section of the coded plate. Erroneous deflection of various degrees outside the usable area and to the extremities of possible deflection will produce corresponding distinct binary code output signals from the code rows added to the coded plate. The resultant target output signals form a binary number which is compared with the converted binary code address signals in a binary number comparator. The output of the comparator is applied to the deflection system to adjust the deflecting voltage until converted address and target output numbers agree, at which point the beam is locked in a position corresponding to the address number.

Thus each beam position corresponds to a precisely adjusted or final deflecting voltage, and any one of a plurality of preassigned potentials may be produced accurately and rapidly across the deflection system with the positional accuracy dependent upon the accuracy of a passive element, the coded plate. The system in accordance with the invention assures the same high speed of servo beam positioning for every possible initial beam deflection position.

In accordance with one feature of this invention, the deflection system is energized selectively by analog values of groups of binary coded input digits, a converted form of the input pulses being applied to a logic comparison circuit in parallel form.

More particularly in accordance with this feature of this invention, the means employed to apply the input digits to the comparison circuit comprises means inserting the complement of the most significant input digit as the next most significant digit in a converted number having one more digit position than the input number.

It is another feature of this invention that the aperture plate contain an additional digit position column of apertures to provide binary output numbers having one more digit than the binary input numbers.

It is another feature of this invention that the aperture plate be provided with additional rows of apertures beyond the coordinate deflection position limits defined by the input binary numbers, each of said additional rows having distinct aperture arrangements.

A complete understanding of this invention and of the above-noted and other features thereof may be gained from consideration of the following detailed description and the accompanying drawing, in which.

Figure 1:
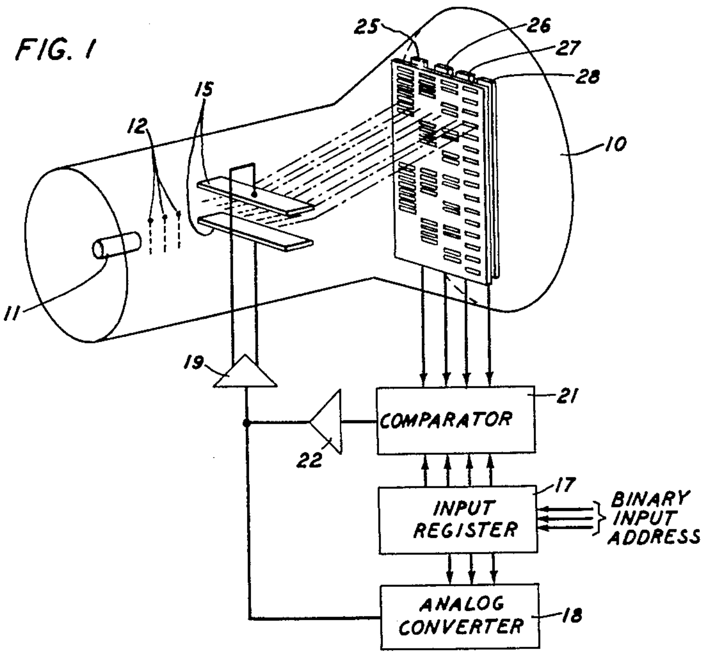
Fig. 1 is a simplified diagram showing the components and their relationship in a cathode ray device and associated circuitry, illustrative of one embodiment of this invention.

Referring now to the drawing, Fig. 1 depicts a cathode ray device comprising an evacuated enclosing vessel 10, at one end of which is mounted an electron gun 11 for provision of a suitable source of electrons. Beam forming elements 12, positioned in the path of the electron beam from the gun 11 may be of any desired number and configuration so as to function in a manner analogous to cylindrical lenses, thereby providing a flat, thin beam or plane of electrons to the aperture plate 13. The beam forming elements 12 may be connected to any suitable sources of accelerating and beam focusing potentials to provide such a configuration and may be electrostatic, electromagnetic, or a combination of both types of electron control means.

The coded plate 13 is provided with a plurality of apertures arranged in rows and columns, as shown in the drawing. The rows of apertures permit portions of the electron beam focused on the plate to be received by target electrodes 25 through 28 so as to form electrical signals designating binary code numbers on the plurality of output leads from the target electrodes. The apertures in the coded plate 13 are arranged to form code groups in accordance with the binary number system and specifically in this illustrative embodiment, in the conventional binary number code.

The coded plate 13 and associated target electrodes 25 through 28 may be positioned within the cathode ray tube, as shown, or the tube may be provided with a phosphorescent screen to provide an external light beam which may be focused on the aperture plate outside the tube. The target electrodes in such an arrangement are replaced by photosensitive devices to receive light passing through the apertures in the plate 13. It is to be noted that the coded plate 13 in Fig. 1 extends to the maximum possible deflection positions of the electron beam and that each row of apertures therein has a distinct arrangement.

Deflection plates 15 in Fig. 1 are arranged to deflect the electron beam to any one of the aperture rows in the medial information portion of coded plate 13 in accordance with the potential applied between plates 15. The deflection potential is determined by a binary code address comprising, in this illustrative embodiment, groups of signals representing digits of a conventional binary code number. The address number is applied in parallel form to an input register 17.

Each signal in the group of binary code address signals is converted into an analog representation in the analog converter 18 and the summation of the analog representations is amplified by summing amplifier 19 and applied to deflection plates 15. Each discrete potential applied between deflection plates 15 is intended to deflect the electron beam so as to impinge upon a corresponding row of apertures in the medial information portion of coded plate 13. The binary code address number is applied also in parallel form from the input register 17 to the comparator 21. Simultaneously, output signals from the target electrodes are applied to comparator 21 in parallel form and designate the binary number formed by the row of apertures to which the electron beam has been addressed.

However, it should be noted that, in accordance with an aspect of my invention, while the binary input address is applied directly through the input register 17 to the analog converter 18, the input address is itself converted to a different binary code having one more digit before being applied to the comparator 21. This code conversion may be effected by the input register, as described further below, and may comprise the insertion into the second most significant digit position of the complement of the most significant digit. This code conversion is indicated schematically in Fig. 1 by showing one more digit indicating arrow from the input register 17 to the comparator 21 than from the input register 17 to the analog converter 18.

The target electrodes reflect two signaling conditions; i.e., current and no current, dependent up electrons in the beam passing through the coded plate or being blocked by the coded plate. Thus a portion of the beam passing through an aperture in a column of the coded plate 13 forms a "current" or "one" signal on the corresponding target. If the beam in a particular deflection position is intercepted by the coded plate 13 in one of the columns, the target corresponding to that column will register a "no current" or "zero" signal. Collectively, the targets 25 through 28 provide a plurality of "one" and "zero" signals representing the digits of a binary number, as established by the beam addressed to a particular code row of the coded plate 13.

The comparator 21 may be of the type described in my application Serial No. 651,864, filed April 10, 1957, in which two binary numbers received simultaneously at distinct parallel inputs will provide a single output signal defining the magnitude and sign of the difference between the applied numbers. The comparator output signal, which in this instance is derived from the converted binary signals from the input register 17 and the targets 25 through 28, is amplified by the deflection amplifier 22 and applied to summing amplifier 19.

Should the electron beam be improperly positioned, the group of binary signals formed at the targets 25 through 28 will represent a binary number which is greater or less than the binary number formed by the group of binary input signals. The signal provided by the comparator 21 to the deflection plates 15 serves to drive the beam in the proper direction to achieve a correspondence between the revised binary address number and the output number of the target electrodes.

By proper arrangement of the rows of apertures on the plate 13 to form a sequence of binary numbers, it is possible for the comparator to determine the amount of error in actual deflection of the beam, having received from the input register the binary number representing the row of apertures on the plate 13 to which the beam should be deflected.

Figures 3A, 3B:
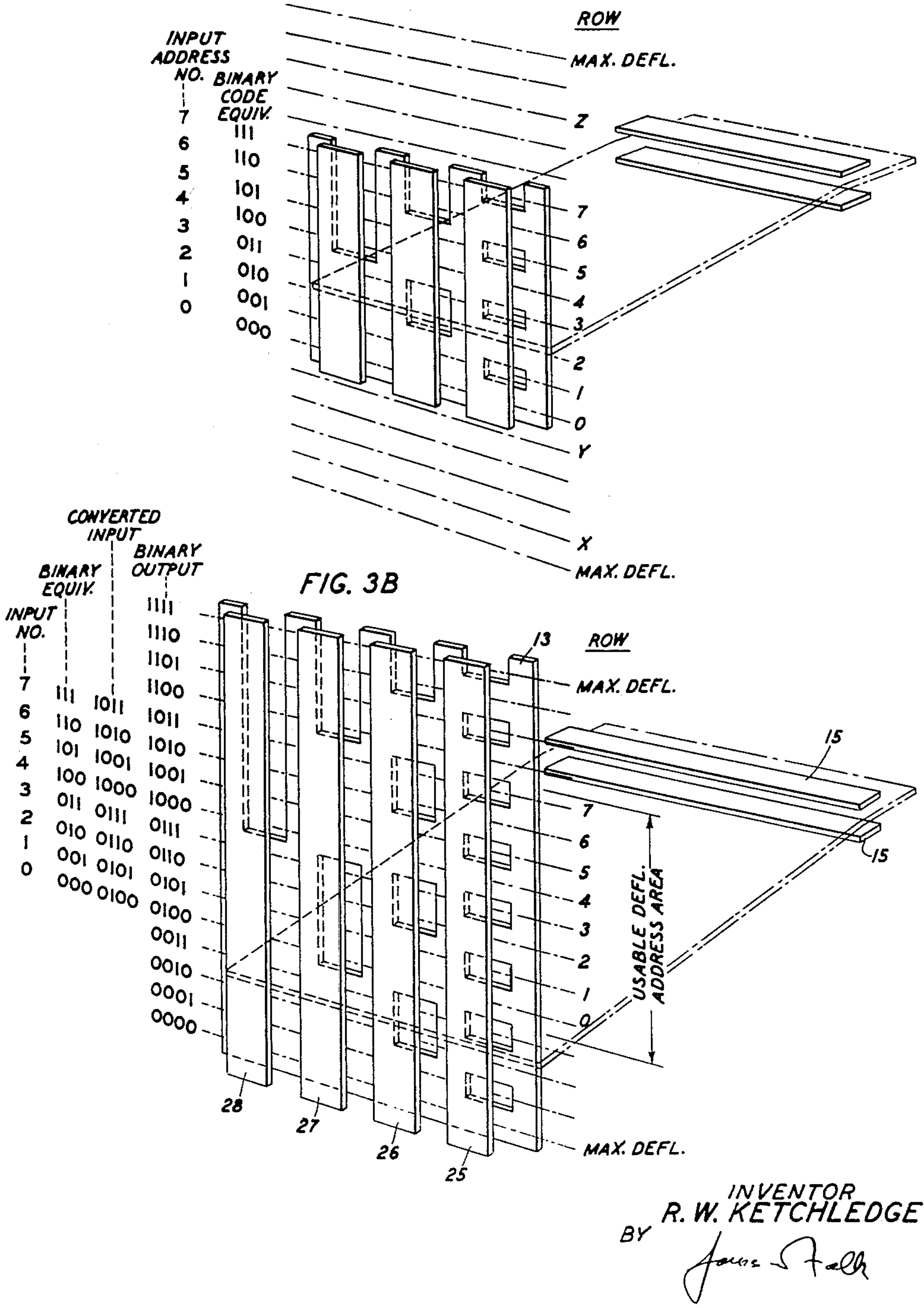
Fig. 3A is a representation of a coded plate according to the prior art.
Fig. 3B is a representation of the coded plate in accordance with Fig. 1, designating particular binary codes formed by the apertures.

Fig. 3A depicts a coded plate as known in the art arranged to receive the deflected electron beam in positions corresponding to the original three digit binary code address. Eight different code combinations 0–7 are possible with this three digit address. Consequently eight distinct positions on the coded plate may be reached by application of analog representations of these code combinations to the beam deflection system. These eight positions on the plate contain rows of apertures in distinct arrangements to correspond to the binary code address numbers and constitute the information portion of the coded plate within the usable deflection address area. In this instance an aperture in the coded plate represents a binary "one" and no aperture represents a binary "zero" so that current in a target electrode indicates a binary "one" and its absence, a binary "zero." Thus upon receipt of the address number three, 011 in binary form, the beam, if correctly deflected, will impinge upon row 3 of the coded plate which is arranged to produce the binary number (011) in electrical signals on the target electrodes.

It is noted that erroneous address of the electron beam to any position above or below the edges of the coded plate, Fig. 3A, would provide the same output signals as would the beam if addressed to row zero of the information portion. Such identical output signals from the areas above or below the information portion will not permit proper operation of the repositioning circuit.

Should the beam be incorrectly positioned within the information portion, comparison of the output and address numbers will result in a correction signal of a magnitude and sign which will serve to drive the beam to the desired address position. For example, the binary code address number is three (011), but rather than being addressed to the corresponding row on the coded plate, the beam is incorrectly deflected to impinge the row corresponding to the binary number zero (000). Comparison of address and output numbers will result in an error correction signal serving to drive the beam three rows upward to the row containing the desired binary number three (011).

Now assume that the same binary address "three" is applied, but due to some transient condition, the beam is erroneously deflected to position X on the coded plate, well outside the range of the eight positions in the medial information portion, or beyond the bottom edges of the coded plate and targets. The comparator again receives an indication that the beam is at row zero (no signal on the target electrodes) and will provide an output sufficient to drive the beam from row zero to row three. The deflection change, in this instance, is only sufficient to bring the beam to position Y and further correction is required to reach the desired address. A more serious problem results if the transient condition should cause the beam to overshoot the upper edge of the information portion; viz., to position Z, again resulting in a "zero" output number. The comparator, receiving an input "three" and output "zero," will provide a signal to drive the beam upward three rows, resulting in an even more flagrant error condition.

In accordance with my invention, code rows are added to the coded plate beyond the edges of the media information portion so as to extend the coded plate to the maximum beam deflection limits as shown in Fig. 3B. Each added row comprises a distinct binary code designation such that an erroneous deflection of the beam to a row in these extreme portions will be identified solely with that row.

The medial information portion of the coded plate in the usable deflection address area as shown in Fig. 3B utilizes all of the available three digit binary code designations to match the three digit binary input numbers so that, in order to provide distinct code designations in the extreme portions, a different code or a higher order of the same code is required. Provision of two different codes or different orders of the same code on the coded plate obviously would not be compatible with the balance of the repositioning system since comparisons with the input information could not be conducted.

I have found that the problem of compatibility may be solved by converting the input information to a higher order code and supplying this converted input information to the comparison means. The coded plate similarly is converted to reflect the higher order code designations such that the medial portion contains the binary code address numbers in the converted form. Thus, further in accordance with my invention, a digit position is added to the address number as applied to the comparator 21, Fig. 1, by insertion of the complement of the most significant digit as the next most significant digit in the expanded address number. The number of target electrodes and the corresponding columns in the coded plate 13 also are increased by one to correspond to the number of digits in the converted binary code address number.

Figure 2:
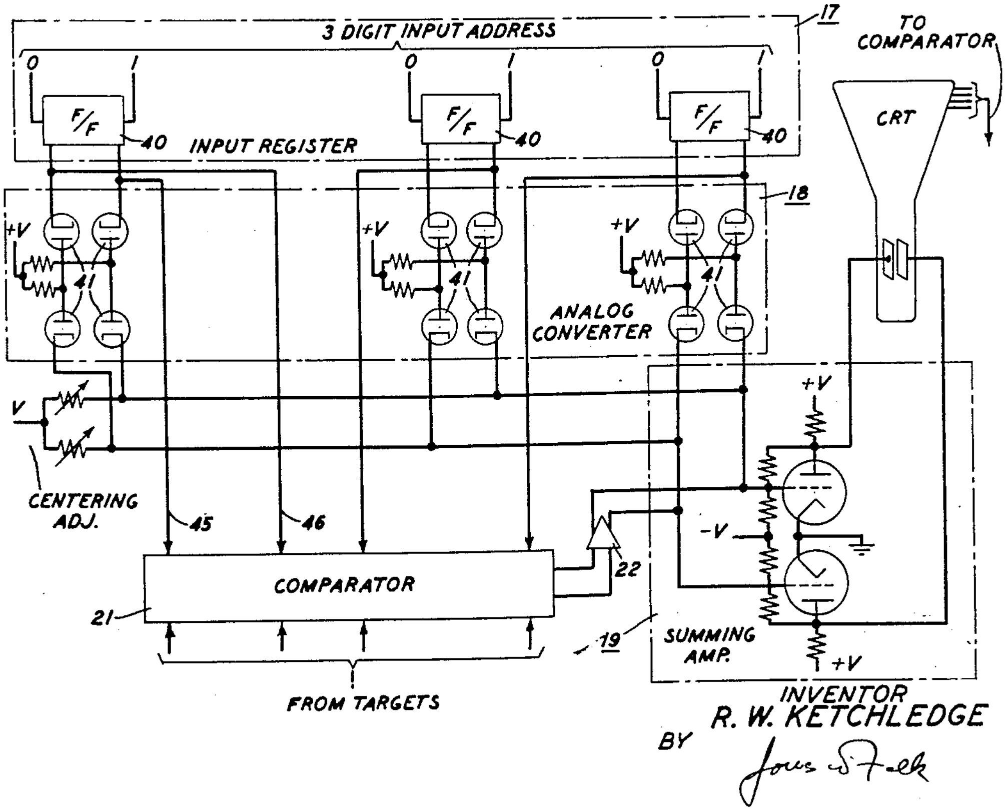
Fig. 2 is a schematic representation, mainly in block diagram form, of one specific embodiment of this invention in accordance with Fig. 1.

One method of revising the binary address in accordance with my invention is indicated in Fig. 2. The input register 17 and its associated analog converter 18 may be of any number of circuits capable of generating analog representations on application thereto of simultaneous input pulses. The input register, for example, may comprise a series of bistable flipflop units such as 40, arranged to feed simultaneously through diodes such as 41 of analog converter 18, which in turn is capable of passing stepped amounts of current to summing amplifier 19. The flipflop units also feed simultaneously into the comparator 21.

The output of flipflop unit 40, representing the most significant address digit, is connected to the most significant digit input of comparator 21 over lead 45 such that a "one" address digit appears as a "one" in the most significant digit position of comparator 21. Also, the output of flipflop unit 40 for the most significant address digit is inverted and applied to lead 46 such that a "one" address digit appears as a "zero" in the next most significant digit position of comparator 21. This may be accomplished, for example, by connecting lead 46 to the "zero" output of flipflop 40 as shown in Fig. 2. Alternatively, lead 46 may be connected to lead 45 through an inverter. In this fashion the binary code address number is revised as applied to the comparator 21 so as to insert an additional digit position between the most significant and next most significant digits. The signals derived from this added position designate the complement of the most significant digit of the address number.

The three digit binary code employed in the example of Fig. 3A is also shown in Fig. 3B, together with the equivalent four digit form applied to the comparator after conversion in the manner described hereinbefore. Coded plate 13 in Fig. 3B is also converted to the four digit code so that its outputs through targets 25–28 to the comparator will be compatible with the converted address from the input register. The four digit code contains distinct code designations in addition to those corresponding to the three digit deflection address information as shown in Fig. 3B, and these additional code designations are employed in the extreme deflection areas exclusively for repositioning the beam if erroneously deflected beyond the usable deflection address area.

It is to be noted that the converted three digit binary code address designations advantageously fall in the medial portion of the four digit binary code. Thus, an adequate supply of code designations is available on either side of the medial portion to satisfy the requirements for distinct code designations in the extreme deflection areas of the coded plate 13. Further, it is apparent that the rows of the coded plate are in true binary code with the converted smaller binary code in the medial portion of the coded plate.

The invention is not limited to code groups of any particular number of digit positions. It is only required that the columns of apertures in the coded plate 13 and the corresponding number of target electrodes be one more than the number of positions in the binary input address number. If desired, an additional "quantizing" column of apertures may be employed to lock the beam at a row of apertures and to prevent positioning between rows of apertures, as is known in the art.

It is to be understood that the above-described arrangements are illustrative of the application of the principles of this invention. Other arrangements may be devised by those skilled in the art without departing from the spirit and scope of the invention.

What is claimed is:

1. A beam positioning system for correction with equal facility of beam deflection errors occurring both within and beyond the usable deflection range of the beam comprising means for positioning the beam in the usable deflection range in accordance with beam address information in a first code form, means for converting said beam address information to a second code form, means including beam receiving means coded in accordance with said second code form for repositioning said beam upon comparison of the output of said beam receiving means with said beam address information in said second code form, said beam address information in said second code form being located in said beam receiving means in the usable deflection range.

2. A beam positioning system for rapid correction of beam deflection errors outside of the usable beam deflection range comprising a coded plate having distinct rows of elements in a medial portion positioned to receive a beam in the usable deflection range and in each portion above and below the edges of said medial portion, means including said coded plate for repositioning a beam upon comparison of the output of said coded plate with coded beam address information and means for converting said address information to a code having at least one more digit position, said plate being coded in accordance with said converted code and said beam address information being contained in said medial portion of said coded plate.

3. A beam positioning system comprising a row of targets, means opposite said targets for forming and projecting a ribbon beam toward said targets, a code plate intermediate said targets and said beam projecting means, said plate having rows of distinctly different code groups, said beam impinging said plate in a line parallel to said rows, each of said targets being positioned to receive portions of said beam passing through a distinct section of each of said code plate rows, means for deflecting said beam in a direction perpendicular to said line of impingement on said plate, means for applying a binary code address to said deflecting means for beam deflection within a limited range, means for comparing signals from said targets with said binary code address, means for applying the resultant of said comparison to said deflecting means, and means for correcting erroneous beam deflection outside said limited range comprising rows of distinctly different code groups in areas of said code plate beyond said limited range, the digit positions in said coded rows being one more than the digit positions in said binary code address, and means for adding one digit to said binary code address upon application to said comparison means.

4. A beam positioning system in accordance with claim 3 wherein said digit adding means comprises means for adding the complement of the most significant address digit as the next more significant digit in the converted address number.

5. A beam positioning system in accordance with claim 3 wherein said binary code address applying means comprises an input register storing code groups of positioning signals, said signal comparing means being connected between said input register and said row of targets.

6. A beam positioning system in accordance with claim 5 wherein said binary code address applying means comprises amplifying means connected to said deflection means and means connected between said input register and said amplifying means for deriving analog representations of said code groups of positioning signals and applying said representations to said amplifying means.

7. A beam positioning system comprising a code plate having rows of distinctly arranged elements corresponding to binary code numbers presented to the beam in one coordinate, there being $n+1$ elements in each row and more than $2^n$ of said rows, means for projecting a beam initiated by a source in an electron discharge device toward said code plate, target means associated with said code plate for deriving output information dependent upon the address of said beam to said code plate, means for deflecting the beam in said one coordinate, means for supplying $n$ digit binary code address information, means for applying said address information to said deflecting means, means for converting said address information into a code of $n+1$ digits, and means for comparing said converted address information with said output information for repositioning said electron beam.

8. A beam positioning system comprising an electron discharge device, means for establishing a beam in said device, beam interception means having more than $2^n$ regions upon which said beam selectively impinges, $n$ being any integer, each of said regions comprising $n+1$ discrete areas having one of transmitting and intercepting characteristics, $n+1$ target means, each of said target means positioned to receive portions of said beam transmitted through a corresponding one of said discrete areas in each of said regions, whereby said target means are impinged upon by said beam to form one of more than $2^n$ coded output numbers corresponding to said coded regions, beam deflecting means, input means storing $n$ address signals representing one of $2^n$ code permutations for deflecting said beam within a range on said beam interception means including said $2^n$ code permutations means converting said $n$ address signals to $n+1$ signals, means comparing said converted address signals with said target output number and means applying the resultant of said comparison to said deflection means.

9. A beam positioning system for cathode ray tubes comprising means for supplying beam address information in the form of an $n$ digit binary code, means converting said address information into a code having more than $n$ digits, said address information representing only a medial group of values of said converted code, beam interception means having rows and columns of elements, each row having the number of elements equal to the number of digits of said converted code and there being more than $2^n$ rows, means for projecting an electron beam toward said interception means, means for deflecting said beam in accordance with said address information, output means associated with said elements for deriving output information dependent on the position of said beam at said interception means, and comparison means for comparing said output information with said converted address information for repositioning said electron beam.

10. A beam positioning system in accordance with claim 9 wherein said converting means includes means for taking the complement of the most significant digit of said digit binary code address and inserting it as the second most significant digit of said $n+1$ digit binary code.

11. A beam positioning system for rapid correction of deflection errors outside of the usable region of deflection comprising means including a coded plate and target elements for repositioning a beam upon comparison of the output of said target elements with coded deflection input information and means for converting said input information to a code having at least one more digit position, said plate being coded in accordance with said converted code and said deflection input information being positioned in the medial portion of said plate.

References Cited in the file of this patent

UNITED STATES PATENTS

| | | |
|---|---|---|
| 2,203,528 | Harnett | June 4, 1940 |
| 2,531,600 | Barney | Nov. 28, 1950 |
| 2,568,449 | Hansen | Sept. 18, 1951 |
| 2,671,129 | Moore | Mar. 2, 1954 |
| 2,675,500 | Kuchinsky | Apr. 13, 1954 |
| 2,762,949 | Huffman | Sept. 11, 1956 |
| 2,855,540 | Hoover | Oct. 7, 1958 |